(12) United States Patent
Herman et al.

(10) Patent No.: US 6,594,448 B2
(45) Date of Patent: Jul. 15, 2003

(54) RADIALLY-ORIENTED PLANAR SURFACES FOR FLARE REDUCTION IN PANORAMIC CAMERAS

(75) Inventors: Herman Herman, Pittsburgh, PA (US); Sanjiv Singh, Pittsburgh, PA (US); Anthony Stentz, Pittsburgh, PA (US); Michael Rondinelli, Bethel Park, PA (US)

(73) Assignee: Eyesee360, Inc., Pittsburgh, PA (US)

( * ) Notice: Subject to any disclaimer, the term of this patent is extended or adjusted under 35 U.S.C. 154(b) by 0 days.

(21) Appl. No.: 10/081,792

(22) Filed: Feb. 22, 2002

(65) Prior Publication Data

US 2002/0146248 A1 Oct. 10, 2002

Related U.S. Application Data

(60) Provisional application No. 60/271,157, filed on Feb. 24, 2001, provisional application No. 60/271,154, filed on Feb. 24, 2001, and provisional application No. 60/326,013, filed on Sep. 27, 2001.

(51) Int. Cl.[7] ............................................... G03B 37/02
(52) U.S. Cl. .......................................................... 396/21
(58) Field of Search ........................... 396/21, 351, 427; 348/36

(56) References Cited

U.S. PATENT DOCUMENTS

| | | |
|---|---|---|
| 3,846,809 A | 11/1974 | Pinzone et al. |
| 4,326,775 A | 4/1982 | King |
| 5,657,073 A | 8/1997 | Henley |
| 6,118,474 A | 9/2000 | Nayar |
| 6,157,018 A | 12/2000 | Ishiguro et al. |
| 6,375,366 B1 * | 4/2002 | Kato et al. .................. 396/351 |
| 2002/0130958 A1 * | 9/2002 | Simon et al. ............ 348/222.1 |

OTHER PUBLICATIONS

M. Ollis et al., "Analysis and Design of Panoramic Stereo Vision Using Equi–Angular Pixel Cameras," The Robotics Institute, Carnegie Mellon University, CMU–RI–TR–99–04, Jan. 1999, pp. 1–43.

* cited by examiner

*Primary Examiner*—David Gray
(74) *Attorney, Agent, or Firm*—Robert P. Lenart, Esq.; Pietragallo, Bosick & Gordon

(57) ABSTRACT

A panoramic imaging system includes a convex reflector, a camera, a transparent cylinder for mounting the convex reflector to the camera, and a first radially-oriented planar member positioned in the transparent cylinder between the convex reflector and the camera. A second radially-oriented planar member can be positioned in the transparent cylinder between the convex reflector and the camera. The first and second radially-oriented planar members would preferably lie in perpendicular planes, however, they may lie in non-perpendicular planes. A mirror mount for a panoramic imaging system includes a convex reflector, a transparent cylinder for supporting the convex reflector, means for connecting a camera to the transparent cylinder, and a first radially-oriented planar member positioned in the transparent cylinder between the convex reflector and the camera. A method of reducing unwanted reflections in the panoramic imaging system is also included.

22 Claims, 4 Drawing Sheets

RADIALLY-ORIENTED PLANAR SURFACES FOR FLARE REDUCTION IN PANORAMIC CAMERAS

CROSS-REFERENCE TO RELATED APPLICATIONS

This application claims the benefit of U.S. Provisional Application Serial No. 60/271,157 filed Feb. 24, 2001; U.S. Provisional Application Serial No. 60/271,154 filed Feb. 24, 2001; and U.S. Provisional Application Serial No. 60/326,013 filed Sep. 27, 2001.

FIELD OF THE INVENTION

The present invention relates to photographic imaging, and more particularly to methods and apparatus for eliminating unwanted reflections in panoramic images.

BACKGROUND INFORMATION

Recent work has shown the benefits of panoramic imaging, which is able to capture a large azimuth view with a significant elevation angle. If instead of providing a small conic section of a view, a camera could capture an entire half-sphere at once, several advantages could be realized. Specifically, if the entire environment is visible at the same time, it is not necessary to move the camera to fixate on an object of interest or to perform exploratory camera movements. This also means that it is not necessary to actively counteract the torques resulting from actuator motion. Processing global images of the environment is less likely to be affected by regions of the image that contain poor information. Generally, the wider the field of view, the more robust the image processing will be.

A panoramic camera is a device that captures light from all directions (i.e., 360 degrees), either as still images or as a continuous video stream. The images from such a device can be geometrically transformed to synthesize a conventional camera view in any direction. One method for constructing a panoramic camera combines a curved mirror and an imaging device, such as a still camera or video camera. The mirror gathers light from all directions and re-directs it to the camera. Both spherical and parabolic mirrors have been used in panoramic imaging systems.

Numerous examples of such systems have been described in the literature. For example, U.S. Pat. No. 6,118,474 by Nayar discloses a panoramic imaging system that uses a parabolic mirror and an orthographic lens for producing perspective images. U.S. Pat. No. 5,657,073 by Henley discloses a panoramic imaging system with distortion correction and a selectable field of view using multiple cameras, image stitching, and a pan-flit-rotation-zoom controller.

Ollis, Herman, and Singh, "Analysis and Design of Panoramic Stereo Vision Using Equi-Angular Pixel Cameras", CMU-RI-TR-99-04, Technical Report, Robotics Institute, Carnegie Mellon University, January 1999, discloses an improved equi-angular mirror that is specifically shaped to account for the perspective effect a camera lens adds when it is combined with such a mirror.

Affixing the mirror to the camera is problematic, since any support structure must necessary appear in the device's field of view. One approach is to use a center post to support the mirror. The center post approach leaves the curved mirror exposed to surface dirt. Furthermore, the center post support is inherently weak and prone to bending and optical misalignment. Finally, there is the issue of mounting it to the camera. There is no easy way to affix it to the camera other than boring through the camera's lens or affixing the post to a transparent lens attachment.

Another approach is to make the support structure transparent, by using a glass or plastic cylinder that mounts onto a standard camera lens mount and supports the reflective surface. However, a "transparent" material, such as glass or plastic, is typically not 100% transparent. Some light is not transmitted, but rather it is reflected off the surface of the glass or plastic. Light from the sun or another bright source can reflect off the interior surface of the material, strike the mirror, and reflect into the camera, producing a ghost image of the light source or a line of bright illumination called a flare.

U.S. Pat. No. 6,157,018 discloses an omnidirectional photographic device that uses a convex mirror and a camera coupled together by a transparent cylinder. A centrally mounted object is provided to eliminate rays of light that are internally reflected by the transparent cylinder. However, only internally reflected rays that pass through the axis of the cylinder are eliminated.

There is a need for a panoramic imaging system that provides an improved reduction in unwanted reflections in transparent mirror mounts.

SUMMARY OF THE INVENTION

A panoramic imaging system constructed in accordance with this invention comprises a convex reflector, a camera, a transparent cylinder for mounting the convex reflector to the camera, and a first radially-oriented planar member positioned in the transparent cylinder between the convex reflector and the camera. A second radially-oriented planar member can also be positioned in the transparent cylinder between the convex reflector and the camera. The first and second radially-oriented planar members would preferably lie in perpendicular planes, however, they may lie in non-perpendicular planes. Additional radially-oriented planar members can also be positioned in the transparent cylinder between the convex reflector and the camera. The radially-oriented planar members can each extend diametrically across the cylinder, and preferably include non-reflective surfaces.

The invention also encompasses a mirror mount for a panoramic imaging system comprising a convex reflector, a transparent cylinder for supporting the convex reflector, means for connecting a camera to the transparent cylinder, and a first radially-oriented planar member positioned in the transparent cylinder between the convex reflector and the camera. The mirror mount can further include a second radially-oriented planar member positioned in the transparent cylinder between the convex reflector and the camera. The first and second radially-oriented planar members would preferably lie in perpendicular planes, however, they may lie in non-perpendicular planes. Additional radially-oriented planar members can also be positioned in the transparent cylinder between the convex reflector and the camera. The radially-oriented planar members can each extend diametrically across the cylinder, and preferably include non-reflective surfaces.

The invention further encompasses a method of reducing unwanted reflections in a panoramic imaging system comprising the steps of mounting a convex reflector in a transparent cylinder, inserting a first radially-oriented planar member in the transparent cylinder, connecting a camera to the transparent cylinder, and using the camera to capture an image of a scene embodied in light reflected from the convex mirror. The method can further comprise the step of inserting a second radially-oriented planar member in the transparent cylinder between the convex reflector and the camera. The first and second radially-oriented planar members would preferably lie in perpendicular planes, however, they may lie in non-perpendicular planes. The cameras used in connection with this invention can be still or video cameras.

DETAILED DESCRIPTION OF THE INVENTION

Reflective optics offer a solution to the problem of immersive imaging. A camera placed at a distance with respect to a convex reflective surface can produce a large field of view provided an appropriate mirror shape is provided. As used herein, the term "panoramic visual images" means wide-angle images taken from a field of view of up to 360° around a principal axis. Such images also cover a vertical field of view may typically range from 0.1° to 180°.

Figure 1:
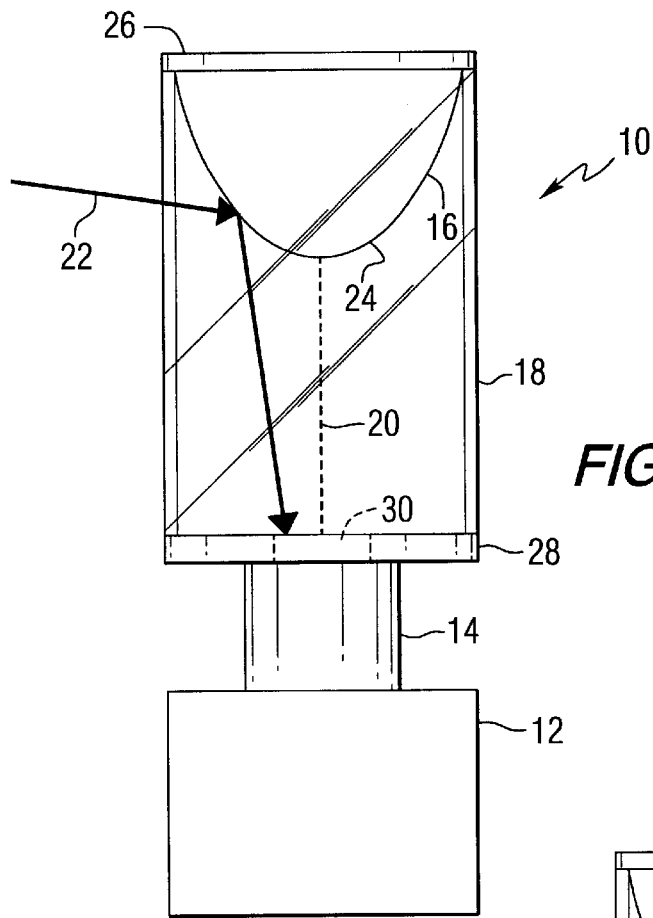
FIG. 1 is a side elevation view of a camera system for producing panoramic images.

FIG. 1 is a side elevation view of a camera system 10 for producing panoramic images. The system 10 includes a still or video camera 12 having a lens 14. A reflecting surface, such as a convex mirror 16 is mounted in transparent cylinder 18 made of, for example glass or plastic. The cylinder 18 has a central axis 20. The mirror 16 gathers light 22 from all directions within a field of view and redirects it to camera 12. The mirror 16 has a profile 24, which substantially defines and describes the shape of the mirror. The central axis 20 intersects the profile 24 so that the profile is symmetric about the central axis. A mirror support 26 can be used to attach the mirror to the cylinder, and a connector 28 can be used to connect the camera to the cylinder. An opening 30 is provided in the connector such that light can pass through the connector to the camera lens.

One common application of this system is to capture a raw spherical image with the convex spherical surface. The raw image can then be unwarped to produce a cylindrical image. The use of such imagery has distinct advantages. First, the camera uses a passive sensor, so power requirements are minimal. Second, it has the potential to be extremely robust, since the sensor is purely solid state and has no moving parts. Third, curved mirrors can be made free of optical distortion that is typically seen in lenses. Fourth, the large field of view available offers substantial advantages for panoramic photography, target tracking, obstacle detection, localization, and tele-navigation of machinery. In the system of FIG. 1, a camera can image a full 360 degrees in azimuth and approach 180 degrees in elevation with an appropriately shaped mirror.

Figure 2:
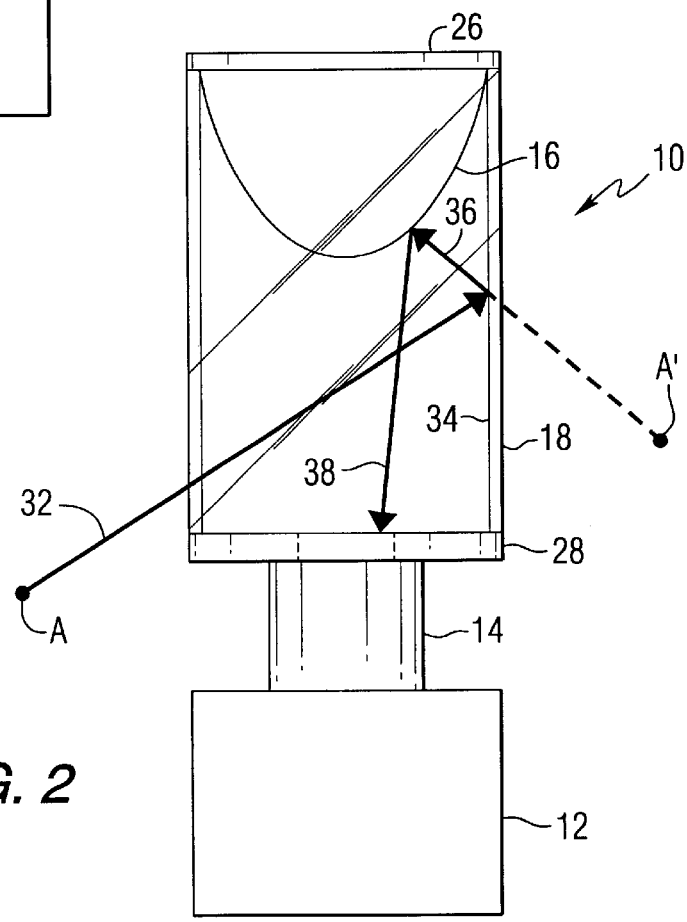
FIG. 2 is a side elevation view of a camera system illustrating how unwanted artifacts can appear in images taken using the camera system of FIG. 1.

FIG. 2 is a side elevation view of a camera system illustrating how unwanted artifacts can appear in images taken using the camera system of FIG. 1. In FIG. 2, light 32 from a bright light source, located for example at Point A, can enter the glass cylinder from the left, and strike the interior surface 34 of the glass cylinder on the right side. Light 32 can then be reflected into the mirror as illustrated by arrow 36 and can be further reflected by the mirror into the camera lens as shown by arrow 38, thereby producing a ghost image of the bright light source. The virtual location of this source is shown as Point A'.

Figure 3:
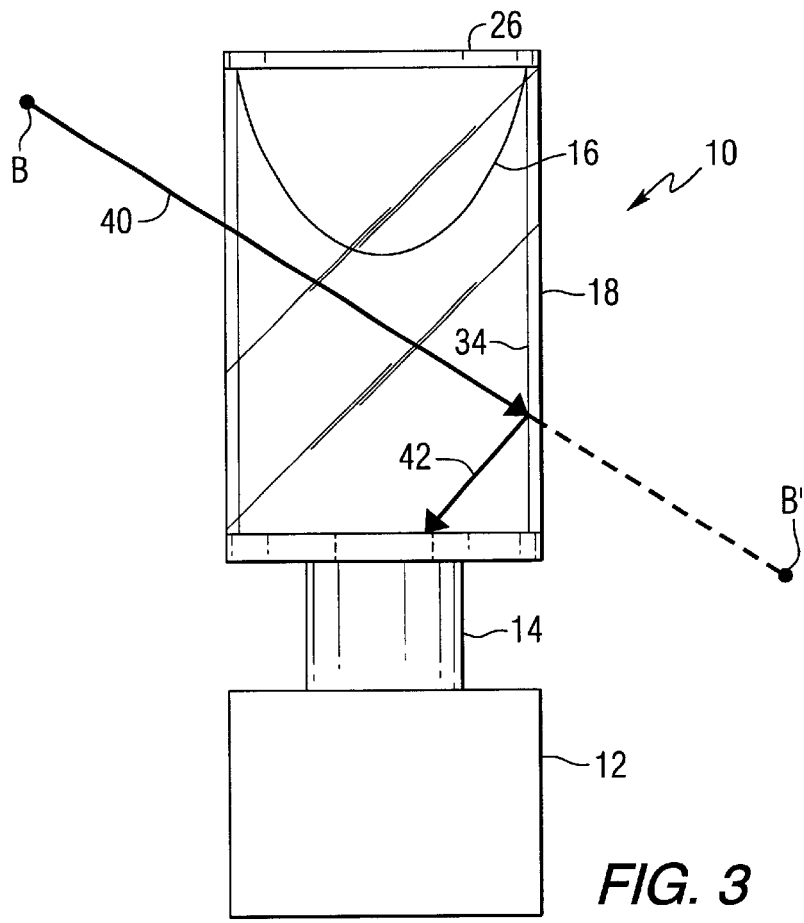
FIG. 3 is another side elevation view of a camera system illustrating how unwanted artifacts can appear in images taken using the camera system of FIG. 1.

FIG. 3 is another side elevation view of a camera system illustrating another way that unwanted artifacts can appear in images taken using the camera system of FIG. 1. In FIG. 3, light 40 from a source at Point B enters the glass cylinder from the left, strikes the interior surface of the glass on the right side, and reflects into the camera as shown by arrow 42, thereby producing a ghost image at virtual location Point B'.

Figure 4:
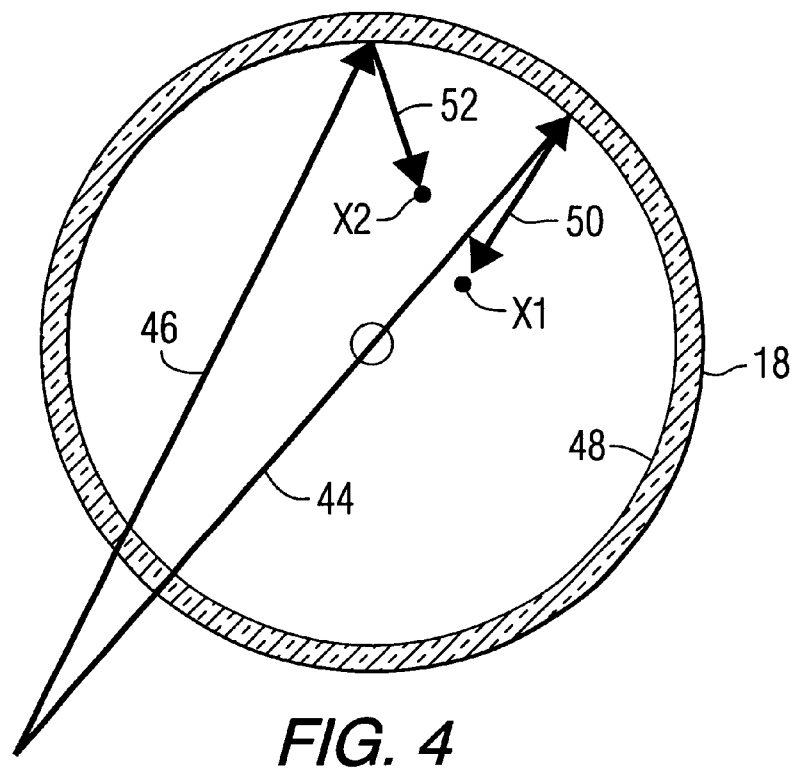
FIG. 4 is a schematic diagram illustrating how unwanted artifacts can appear in images taken using the camera system of FIG. 1.

FIG. 4 is a schematic diagram that further illustrates how unwanted artifacts can appear in images taken using the camera system of FIG. 1, when viewed in the direction of the cylinder axis. Light enters the cylinder 18 along paths 44 and 46 and is reflected at the internal surface 48 of the cylinder. Light on path 44 is reflected as illustrated by arrow 50 to a point X1 at the camera. Light on path 46 is reflected as illustrated by arrow 52 to a point X2 at the camera. The strongest ghost image results from light on path 44 that passes through the optical center of the camera, since it strikes the interior glass surface normal (i.e., perpendicular) to its surface, but other light paths (e.g., path 46) also contribute to ghost images of the light source. While the light rays in FIG. 4 have been described as reflecting directly into the camera, it should be understood that they can also be reflected initially to the mirror and subsequently reflected downward into the camera.

A previous approach for flare reduction was to use a center post extending down from the mirror to eliminate the strongest reflections (e.g. path 44 in FIG. 4) passing through the optical center of the device. The advantage of that approach is that center post minimally obstructs the panoramic camera's field of view. The disadvantage is that the center post does not eliminate those internal reflections that do not pass through the optical center (e.g., path 46 in FIG. 4).

Figure 5:
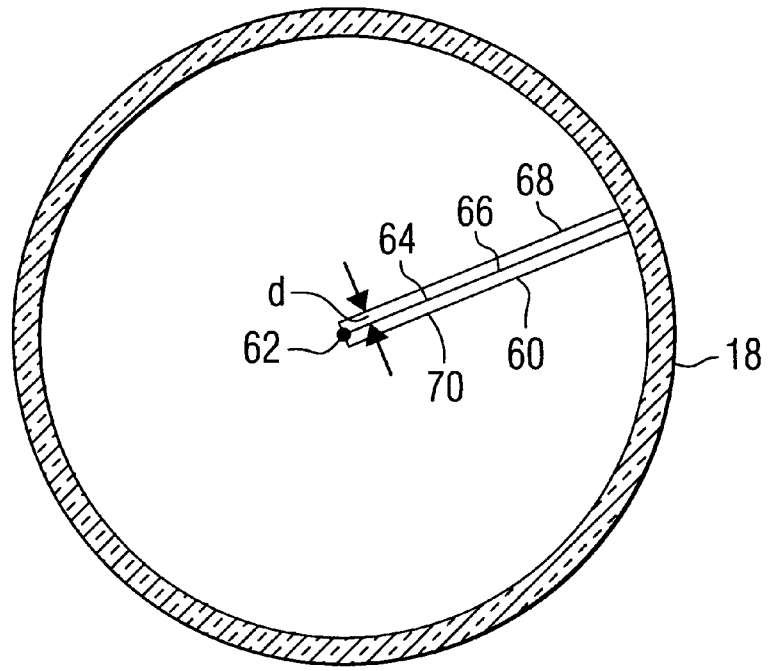
FIG. 5 is a schematic representation of a radially-oriented planar surface in a cylindrical mirror mount.

The invention uses radially-oriented planar members to eliminate a greater amount of internal reflections than a center post. FIG. 5 is a schematic representation of a radially-oriented planar member in the form of a plate 60 in a cylindrical mirror mount. The optical axis of the cylinder is a vertically oriented line, passing through the center of the camera/camcorder lens and intersecting the mirror at its lowest point. The radially-oriented member 60 is extends between the optical axis 62 of the cylinder 18 an the cylinder wall.

A radial axis 64 is a line connecting the optical axis to a point on the glass cylinder. For a given panoramic camera, there are an infinite number of radial axes. A radial plane 66 is a plane that contains both the optical axis and one radial axis. There are an infinite number of radial planes. We define radially-oriented planar surfaces 68 and 70 to be a thin, flat (or nearly flat) surfaces of member 60 oriented such that the minimum distance from any point P on the planar surface is less than some small distance 'd' from the radial plane, and at least part of the planar surface is interior to the glass cylinder.

Figure 6:
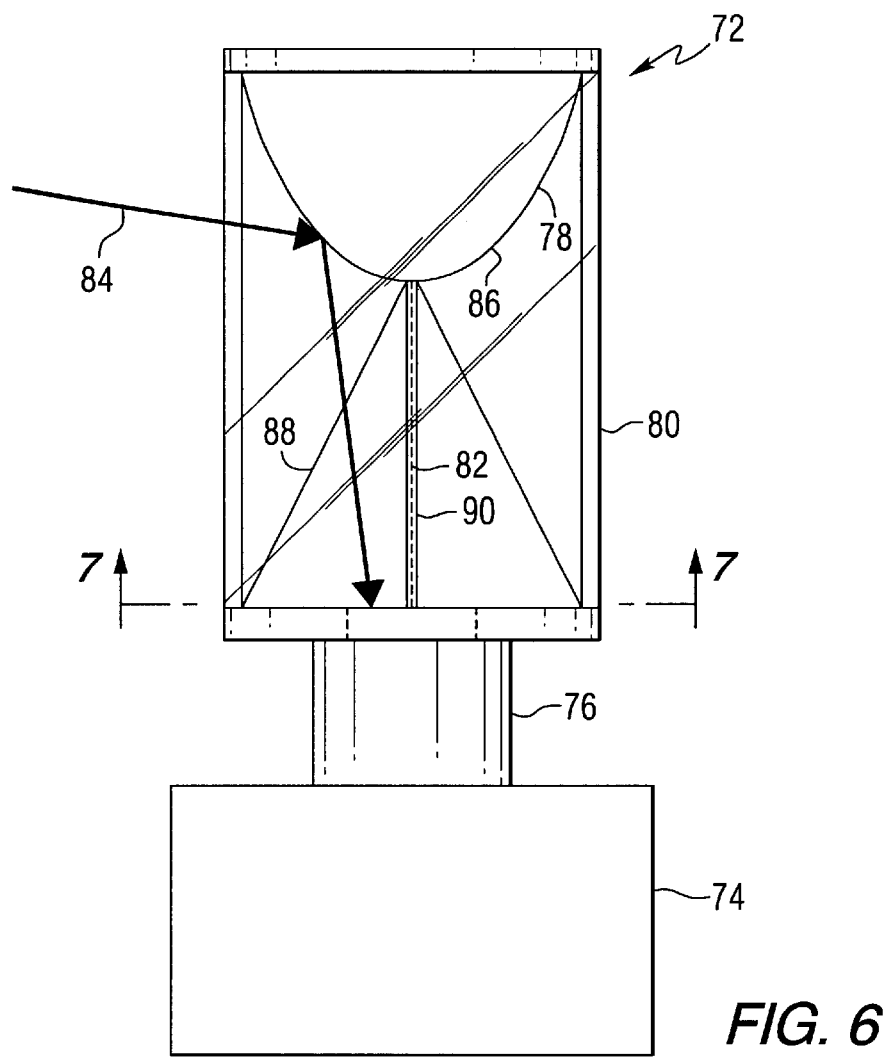
FIG. 6 is a side elevation view of a camera system constructed in accordance with the present invention.
Figure 7:
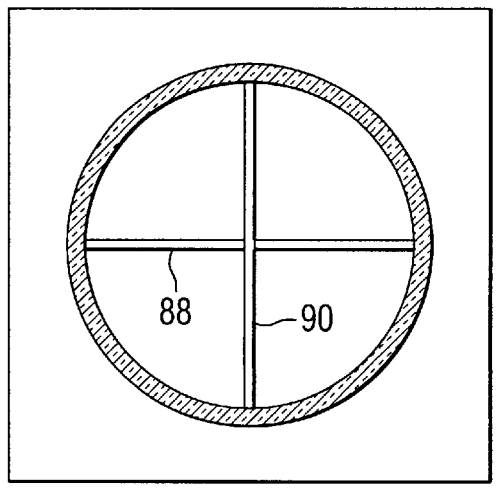
FIG. 7 is a cross-sectional view of the camera system of FIG. 6 taken along line 7—7.

FIG. 6 is a side elevation view of a camera system 72 constructed in accordance with the present invention, and FIG. 7 is a cross-sectional view of the camera system of FIG. 6 taken along line 7—7. The system 72 includes a still or video camera 74 having a lens 76. Typically a convex mirror 78 is mounted in transparent cylinder 80 of, for example glass or plastic. The cylinder 80 has a central axis 82. The mirror 78 gathers light 84 from all directions and redirects it to camera 74. The mirror 78 has a profile 86, which substantially defines and describes the shape of the mirror. The central axis 82 intersects the profile 86 so that the profile is symmetric about the central axis.

Radially-oriented planar members 88 and 90 are positioned within the transparent cylinder and between the reflective mirror and the camera. In this embodiment, the planar members have a triangular shape with an apex pointing toward the surface of the mirror.

The systems of this invention seek to pass as much "desirable" light and to block as much "undesirable" light as possible. The light rays that enter the glass cylinder radially, strike the mirror, and reflect into the camera or camcorder contribute the most to a forming high-fidelity image of the scene. The advantage of the radially-oriented planar members is that they block not only those internal reflections passing through the optical axis of the device (e.g., path 44 in FIG. 4) but also many other internal reflections not passing through this axis (e.g., path 46 in FIG. 4). Since the radially-oriented planar members are preferably non-transparent, they cannot pass radial light rays that strike the members end on, and they will block some off-axis light rays that would otherwise pass from the source to the mirror and down into the camera. Thus the image of the end of the planar members appears in the image, and the brightness of some scene points is diminished.

By using very thin planar members, the images of the members can be made effectively invisible or nearly so. An interpolation scheme, as described in a commonly owned patent application titled "Method And Apparatus For Eliminating Unwanted Portions Of Photographic Images" and filed on the same date as the present application, can be used to eliminate the image of the planar members. The brightness can be corrected either by pre-calibrating the dropout per pixel using a uniform light source or by analytically computing the dropout per pixel by ray tracing. Either way, the brightness can be corrected after the imaging process by scaling up the brightness for each image pixel according to the calculation.

The larger the number of radially-oriented planar members employed, the more internal reflections that will be eliminated, but at the cost of more end-on planar member images and more brightness dropout. Since a planar member is least effective when it is oriented approximately end-on to a bright light source, the preferred embodiment for this invention is two radially-oriented planar members oriented at right angles with each other (see FIG. 6). When one planar surface is least effective, the other is most effective. In the system of FIG. 6, the planar members are triangular in shape, so that incoming light can strike the mirror unimpeded by the planar members, without compromising very much of the invention's ability to block internal reflections. The planar members preferably have a matte or non-reflective finish, so that the planar members do not cause internal reflections.

Figure 8:
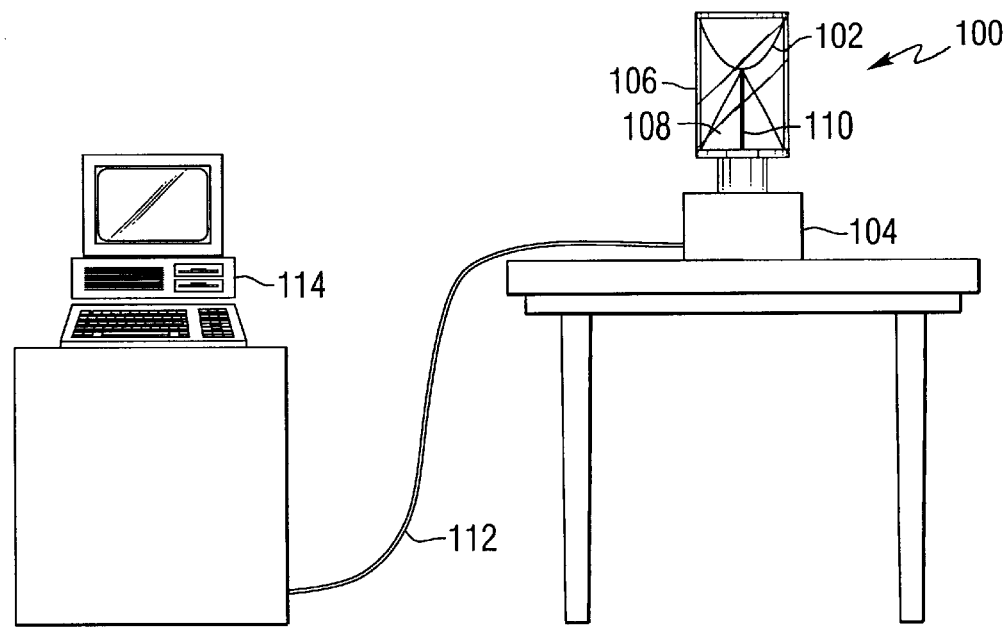
FIG. 8 is a pictorial representation of a camera system constructed in accordance with the present invention.

FIG. 8 shows an example of how this invention could be used in an image processing system. A panoramic device 100 including of a curved mirror 102 mounted on a digital camera 104 via a glass cylinder 106 with two orthogonal triangular-shaped planar members 108, 110 is placed in a room. The panoramic device 100 is connected via a cable 112 to a computer 114. The digital camera captures a panoramic image of the entire room. This digital image is transmitted via the cable 112 or a wireless link to a computer where it is stored on a hard disk, CD, or other storage device. Software corrects the brightness of each image pixel based on its position relative to the planar surfaces. Dewarping software on the computer converts the resultant image into a normal video image corresponding to a single viewing direction and displays it on the computer screen. The user changes the viewing direction using the mouse or keyboard. Instead of single images, a video stream can be digitized, stored, and displayed via computer. The same data can be displayed over the Internet, for example, on a web page. If the data is displayed over the Internet, the dewarping software can also simultaneously generate images with different viewing directions to permit multiple views from different directions. It is also possible to send the unwarped images over the Internet and run the dewarping software on the viewer's machine.

Although the apparatus and method of the present invention has been primarily described for use in a panoramic imaging system, such as the system of FIG. 8, it is to be understood that the apparatus and method of the present invention can be used in any other system that would benefit from the advantages disclosed herein and is within the scope of the present invention.

Whereas particular embodiments of this invention have been described above for purposes of illustration, it will be evident to those skilled in the art that numerous variations of the details of the present invention may be made without departing from the invention as defined in the appended claims.

What is claimed is:

1. A panoramic imaging system comprising:
   a convex reflector;
   a camera;
   a transparent cylinder for mounting the convex reflector to the camera; and
   a first radially-oriented planar member positioned in the transparent cylinder between the convex reflector and the camera.

2. A panoramic imaging system according to claim 1, further comprising:
   a second radially-oriented planar member positioned in the transparent cylinder between the convex reflector and the camera, wherein the first and second radially-oriented planar members lie in different planes.

3. A panoramic imaging system according to claim 2, wherein the planes are perpendicular to each other.

4. A panoramic imaging system according to claim 2, wherein the first and second radially-oriented planar members each extend diametrically across the cylinder.

5. A panoramic imaging system according to claim 2, wherein the first and second radially-oriented planar members each include a non-reflective surface.

6. A panoramic imaging system according to claim 2, further comprising:
   additional radially-oriented planar members positioned in the transparent cylinder between the convex reflector and the camera.

7. A panoramic imaging system according to claim 1, wherein the first radially-oriented transparent member extends diametrically across the cylinder.

8. A panoramic imaging system according to claim 1, wherein the first radially-oriented planar member includes a non-reflective surface.

9. A panoramic imaging system according to claim 1, wherein the camera comprises one of: a still camera or a video camera.

10. A mirror mount for a panoramic imaging system comprising:

a convex reflector;

a transparent cylinder for supporting the convex reflector;

means for connecting a camera to the transparent cylinder; and a first radially-oriented planar member positioned in the transparent cylinder between the convex reflector and means for connecting the camera.

11. A mirror mount for a panoramic imaging system according to claim 10, further comprising:

a second radially-oriented planar member positioned in the transparent cylinder between the convex reflector and means for connecting the camera, wherein the first and second radially-oriented planar members lie in different planes.

12. A mirror mount for a panoramic imaging system according to claim 11, wherein the planes are perpendicular to each other.

13. A mirror mount for a panoramic imaging system according to claim 11, wherein the first and second radially-oriented planar members each extend diametrically across the cylinder.

14. A mirror mount for a panoramic imaging system according to claim 11, wherein the first and second radially-oriented planar members each include a non-reflective surface.

15. A mirror mount for a panoramic imaging system according to claim 11, further comprising:

additional radially-oriented planar members positioned in the transparent cylinder between the convex reflector and means for connecting the camera.

16. A mirror mount for a panoramic imaging system according to claim 10, wherein the first radially-oriented transparent member extends diametrically across the cylinder.

17. A mirror mount for a panoramic imaging system according to claim 10, wherein the first radially-oriented planar member includes a non-reflective surface.

18. A method of reducing unwanted reflections in a panoramic imaging system comprising the steps of:

mounting a convex reflector in a transparent cylinder;

inserting a first radially-oriented planar member in the transparent cylinder;

connecting a camera to the transparent cylinder; and using the camera to capture an image of a scene embodied in light reflected from the convex mirror.

19. A method according to claim 18, further comprising the step of:

inserting a second radially-oriented planar member in the transparent cylinder, wherein the first and second radially-oriented planar members lie in different planes.

20. A method according to claim 19, wherein the planes are perpendicular to each other.

21. A method according to claim 19, further comprising: the step of inserting additional radially-oriented planar members in the transparent cylinder.

22. A method according to claim 18, wherein the camera comprises one of: a still camera or a video camera.

* * * * *

UNITED STATES PATENT AND TRADEMARK OFFICE
CERTIFICATE OF CORRECTION

PATENT NO. : 6,594,448 B2
DATED : July 15, 2003
INVENTOR(S) : Herman Herman et al.

It is certified that error appears in the above-identified patent and that said Letters Patent is hereby corrected as shown below:

<u>Title page,</u>
Item [75], Inventors, omit "Sanjiv Singh, Pittsburgh, PA (US)".

Signed and Sealed this

Twenty-seventh Day of July, 2004

JON W. DUDAS
*Acting Director of the United States Patent and Trademark Office*